United States Patent [19]

Dietzsch

[11] Patent Number: 5,320,694
[45] Date of Patent: Jun. 14, 1994

[54] PROCESS FOR CONNECTING A NUMBER OF SHORT STRIPS OF PHOTOGRAPHIC MATERIAL TO A LONG ROLL

[75] Inventor: Claudius Dietzsch, Langnau a/Albis, Switzerland

[73] Assignee: Gretag Imaging, AG, Regensdorf, Switzerland

[21] Appl. No.: 36,690

[22] Filed: Mar. 25, 1993

[30] Foreign Application Priority Data

Mar. 25, 1992 [DE] Fed. Rep. of Germany ..... 92810222

[51] Int. Cl.⁵ .......................... B31F 5/06; B32B 31/16
[52] U.S. Cl. .................... 156/73.4; 156/157; 156/249; 156/304.3; 156/505; 242/59
[58] Field of Search ............... 156/157, 304.1, 505, 156/73.4, 159, 249, 258, 304.3, 304.5, 544; 242/59; 83/948; D8/70.1

[56] References Cited

U.S. PATENT DOCUMENTS

| | | | |
|---|---|---|---|
| 3,434,898 | 3/1969 | Freedman | 156/157 |
| 3,533,891 | 10/1970 | Puyear | 156/159 X |
| 3,647,599 | 3/1972 | Gardner | 156/502 |
| 4,404,275 | 9/1983 | Hutchinson | 156/249 X |
| 4,468,268 | 8/1984 | Ralph | 156/159 |
| 5,078,828 | 1/1992 | Marglin | 156/505 |

FOREIGN PATENT DOCUMENTS

| | | |
|---|---|---|
| 529934 | 7/1931 | Fed. Rep. of Germany . |
| 2202879 | 7/1973 | Fed. Rep. of Germany . |
| 2327441 | 3/1974 | Fed. Rep. of Germany ...... 156/505 |
| 2345676 | 7/1975 | Fed. Rep. of Germany . |
| 881615 | 4/1943 | France . |

*Primary Examiner*—David A. Simmons
*Assistant Examiner*—Mark A. Osele
*Attorney, Agent, or Firm*—Burns, Doane, Swecker & Mathis

[57] ABSTRACT

A number of short strips of photographic material are connected to one long roll. Individual short strips are cut along their ends, roughly perpendicular to their longitudinal edge so that the edges of the individual strips are roughly perpendicular to the longitudinal edge of the strip. In order to connect the individual strips to form a roll, a double T-joint with essentially the same bending strength as the roll material to be connected is inserted as a connecting piece between ends of the short strips. Shanks of the double-T-joint that are parallel to each other are secured in the area of the longitudinal edges of strips. The connecting bar of the double-T-joint that attaches the two shanks of the double-T-joint is placed against and parallel to the edges of the strips.

10 Claims, 4 Drawing Sheets

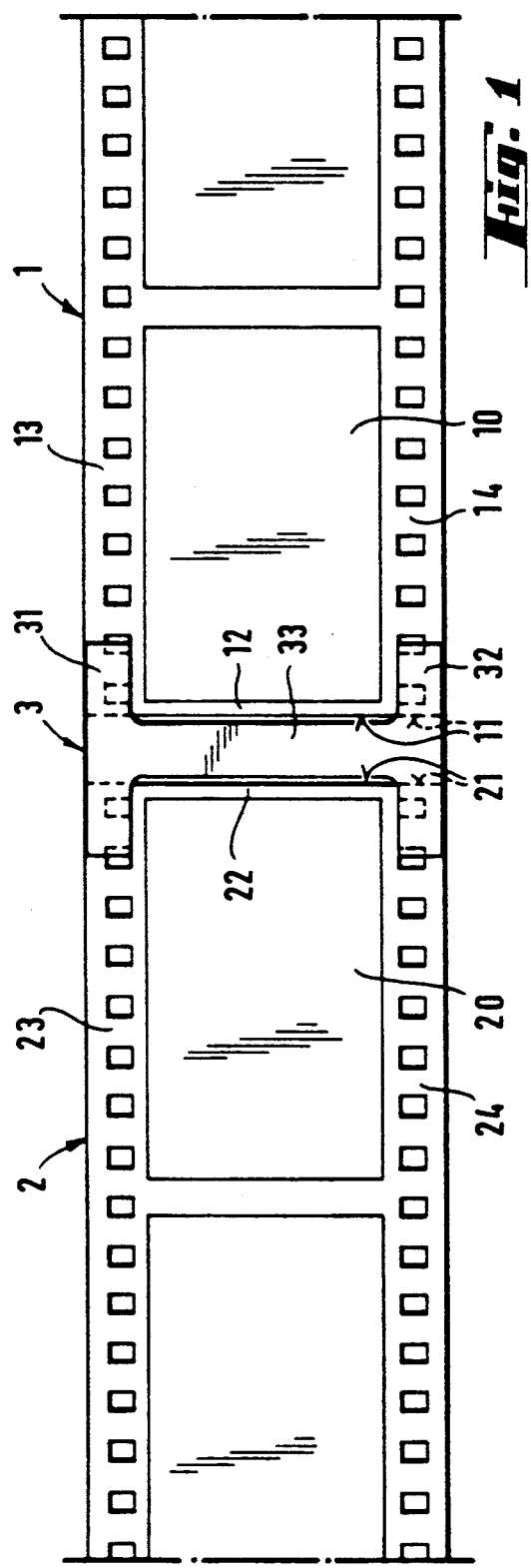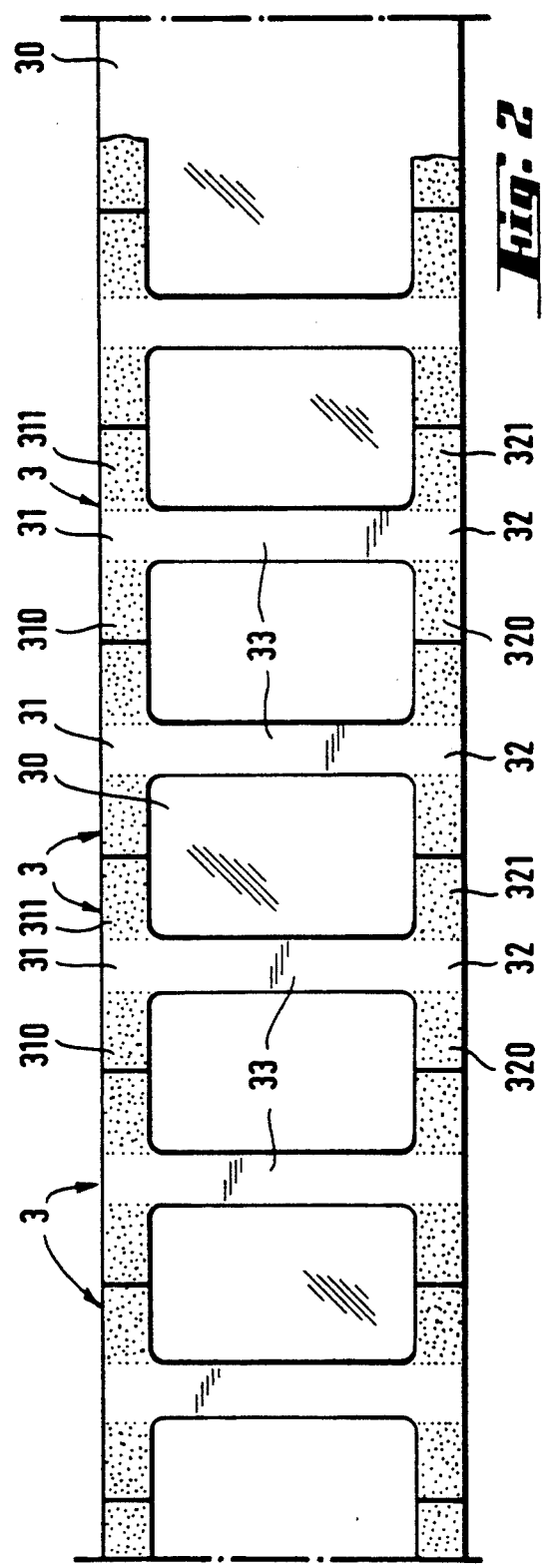

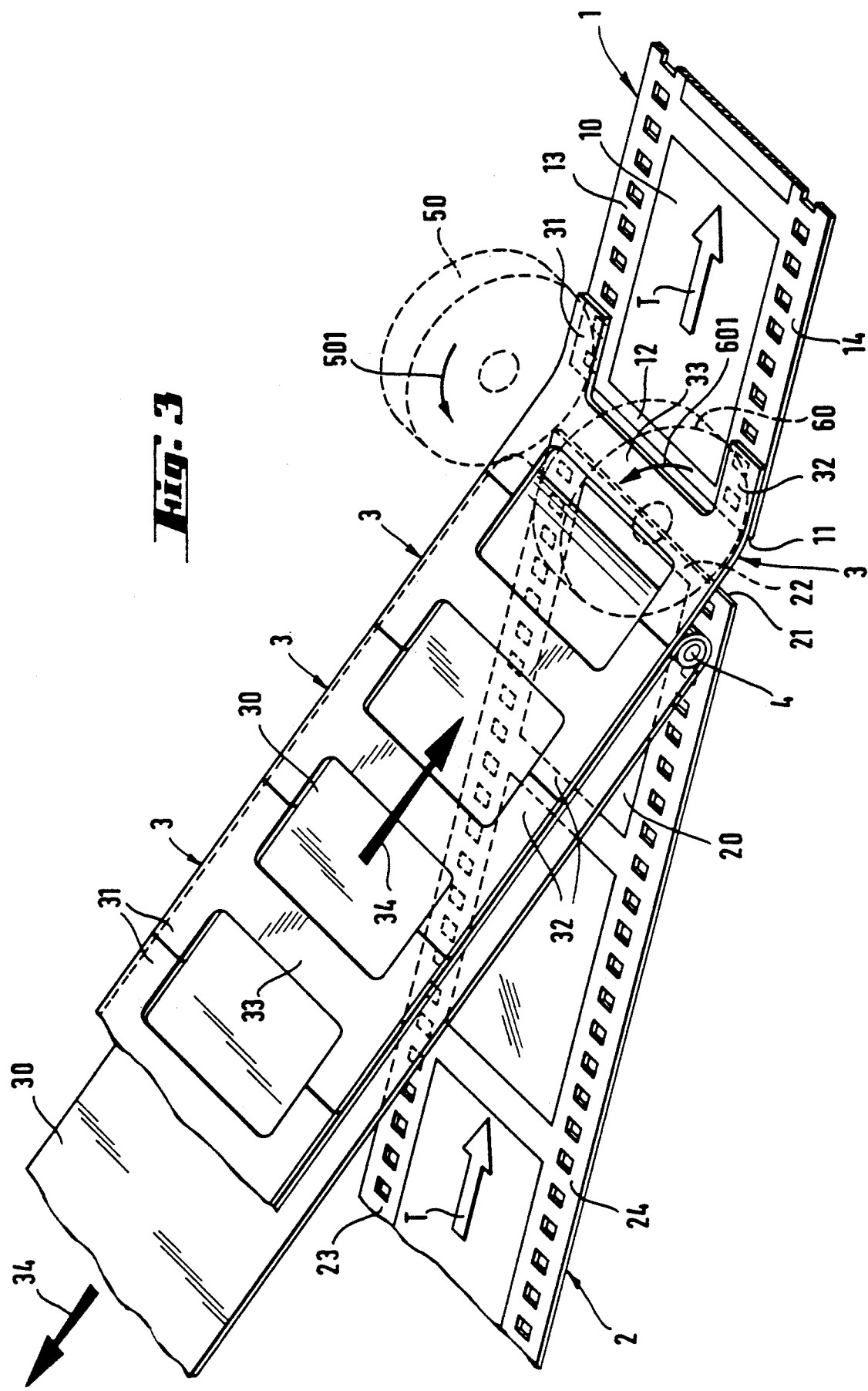

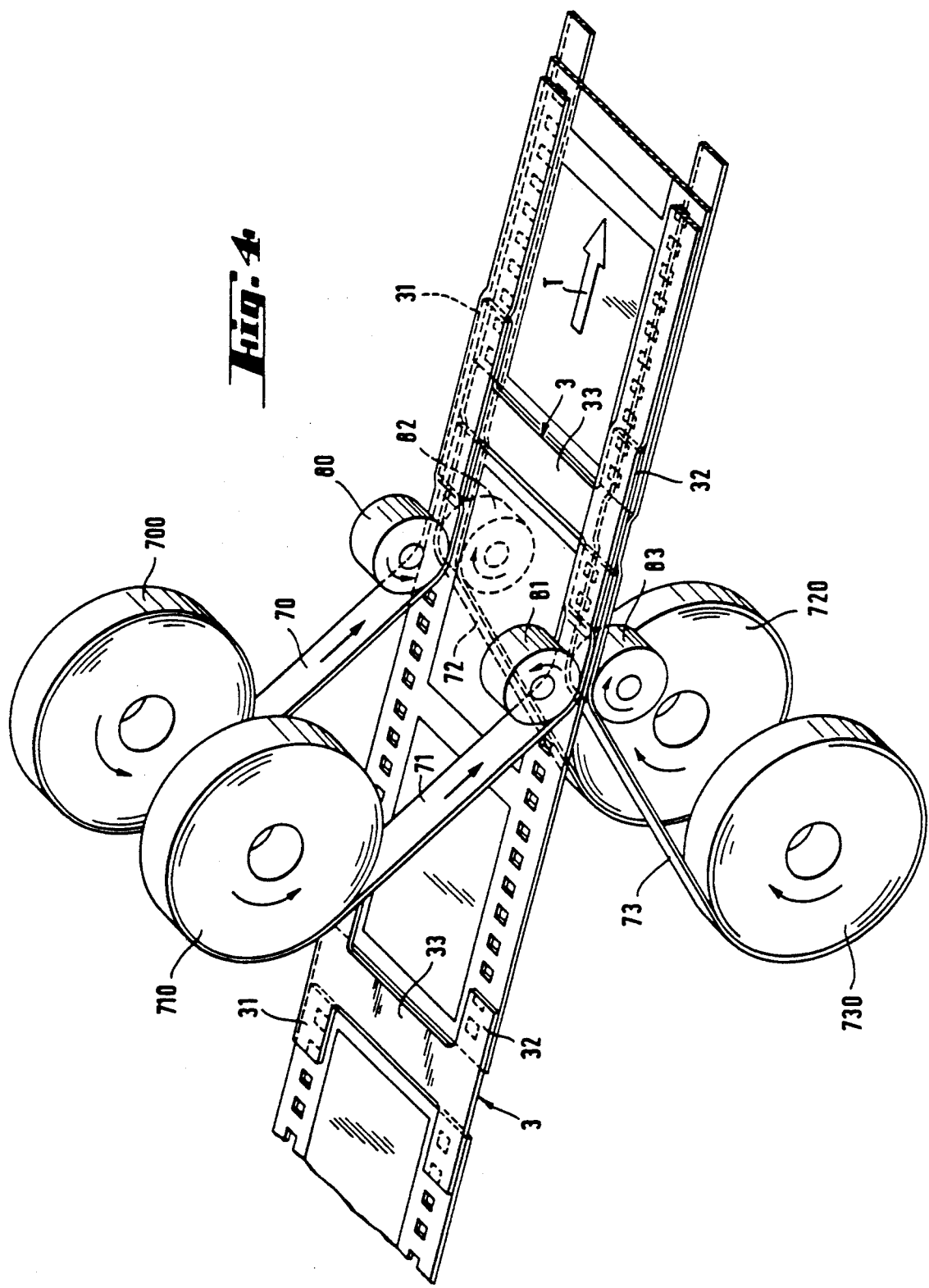

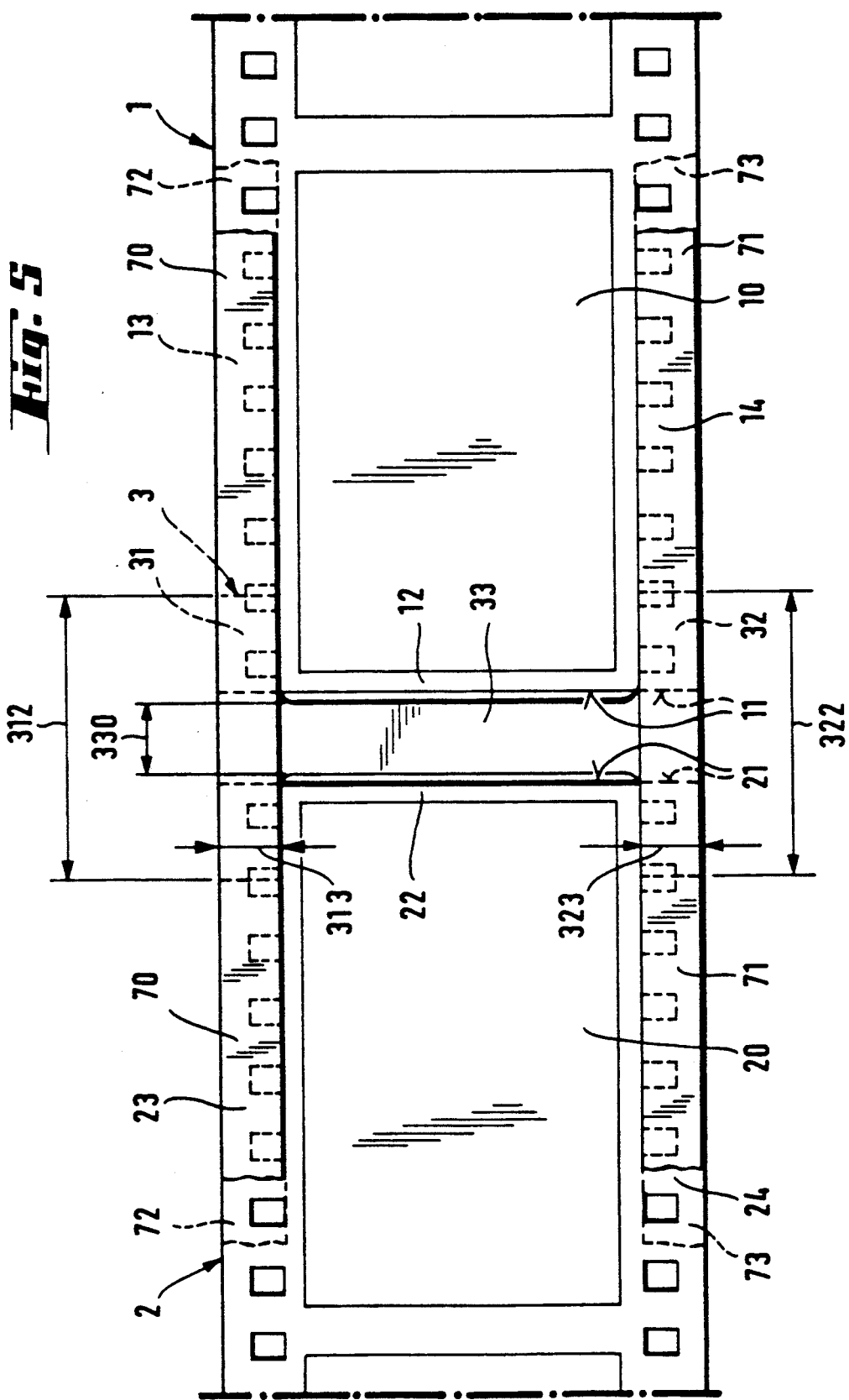

PROCESS FOR CONNECTING A NUMBER OF SHORT STRIPS OF PHOTOGRAPHIC MATERIAL TO A LONG ROLL

BACKGROUND OF THE INVENTION

The present invention relates to a process for connecting a number of shorts strips of a roll of photographic material.

In today's highly automated photo laboratory, prints are produced from the appropriate kind of materials from which reproductions can be made, e.g., from film negatives, usually by using so-called printers. In order to achieve the highest possible level of efficiency with these printers, first a long roll composed of individual film negative strips is produced with the acid of binding materials and this long roll is then processed by the printer. This technique of connecting individual film negative strips is generally known by the term "splicing".

Especially for the recording of films that have already been developed at an earlier time and have been returned to the customer, the negatives are available only in the form of short strips because they were cut into short strips once the film was developed so that they could be inserted into the return envelope for each individual customer. Normally, the films are cut into four, sometimes into six fields of negatives. Looking at uncut strips from their ends, these yet uncut films have a relatively wide area at the beginning and end of the film in which no picture field exist (film leader or trail) so that a splice can be performed at these points easily and comfortably. In case of the short cut film strips associated with reorders, splicing is not easy because the areas between the first picture field and the last picture field, that is at the back end of the front and the front end of the last film strip of the uncut film strips, are very narrow and are often only 1-2 mm or even smaller. On the other hand, the splice must be clearly identified by a corresponding splice detector because once the paper prints have been produced the long roll must be reduced into the original individual short film strips in order to be able to reinsert the individual film strips into the return envelopes for the customer.

Using a known procedure, the individual film strips are connected in such a way that the film strips are connected along the edges with the aid of a piece of adhesive tape, with a continuous roller positioned parallel to it, for example with a paper strip, to form a long roll of film strips on a roller. For example, on the paper strips, individual fields can be positioned in the picture fields of the film strips to indicate how many paper prints are supposed to be produced from the given negative. This roll of film strips on a roller is then processed by the printer.

Further, a procedure for splicing films is proposed in U.S. Pat. No. 4,468,268 for application in movie theaters. The edges of the film ends to be spliced are cut perpendicular to the longitudinal edges. Then a thin layer of the film material is scratched off, for example with a razor blade, at the narrow edge film sections being spliced. Glue is applied on these scratched surfaces. The edges of the film sections are then placed against each other. Then a connecting piece that covers the scratched off area having been coated with glue is applied or pressed on so that the connecting piece (splice) quasi connects both ends of the film sections to each other.

In principle, both procedures are suitable for connecting such short film strips of the kind found in reorders, but they have disadvantages. The disadvantage of the first splicing procedure described above with its additional roller is that a relatively large additional roller is required, resulting in greater complexity. Another disadvantages is that the resulting roll of film strips on a roller is much wider and harder to handle than a narrow roll of film in comparison with it. Particularly the distances to be covered, the guides, and the work stations must be designed for a correspondingly wide roll of film strips on a roller, placing corresponding space demands on the individual stations in the printer and in any subsequent equipment connected to the printer. Furthermore, one has to take in consideration that the roller and the film strips are continuously connected to each other in parallel fashion and the longitudinal film strips are aligned in sequence so that the width of the roll of film strips on a roller essentially remains the same and does not fluctuate in wide areas. Otherwise the transport distances, guides, and work stations would also have to be designed to accommodate such fluctuations in width. This is especially important in view of the fact that a precise positioning of the film material is necessary in the exposure station so that accurate reproduction of the given picture field of the negative onto the copier print can be assured.

In the case of the other procedure described, the disadvantage is that the surfaces have to be scratched off in a complicated fashion so that glue can be applied. Then the glue has to be applied in another step. Only then can the scratched areas that have been coated with glue be connected to each other by means of the connecting piece (splice) that has to be attached to both surfaces. But a precondition for such splicing is that there is a sufficiently wide area available at the film ends being spliced between the front edge and the first picture field or between the back edge and the last picture field. This surface must be cut in a defined way (perpendicular to the edge of the film) whereby a sufficiently large area has to be left over for the scratching step, the application of glue, and for applying the splice. When films are reordered (their front and back edges have already been cut in a defined fashion), usually only a 1-2 mm area up to the edge is left over at the ends of the individual film strips; often this area is even narrower, which makes the application of splices using the aforedescribed procedure more difficult. Even if one assumes that the application of a splice is thoroughly reliable, such splicing of films or film strips continues to have considerable disadvantages.

Depending upon the type of glue used, it is either very difficult or not at all possible to remove the splice after processing, which is important in the case of reorders because the film has to be recut into individual strips following reproduction of the prints in order to be able to reinsert these strips into the envelopes belonging to the given customer.

Another disadvantage results from the fact that in the course of the increasingly downscaled size of modern printers due to growing lack of space in photo laboratories, the interior of a modern printer has to be used in better ways. For this purpose, the spliced rolls being processed are fed and redirected along numerous spools in the interior of the printer. Often the rolls are fed across spools having small diameters, such as spools with a diameter of 15 mm or less, and conveyed around 180° turns (e.g., guiding the roll upwards and downwards). If the splice is secured to both ends of the film across the entire width of the film in the fashion described above, then significant difficulties can appear during the transport of the roll, especially in the case of spools having a small diameter and in the case of sharp changes in direction (redirection). For example, the film can bend if the splice is subject to too much pressure, or the narrow splice can break or rip where the glue has been applied. Interruption-free and unencumbered feeding of the roll cannot always be guaranteed using this kind of splicing, especially not if the roll is guided through spools having small diameters and is subject to sharp changes in direction (redirection) as is the case in modern printers, even if one disregards the complicated nature of achieving such splicing to begin with.

Another disadvantage of film strips spliced together in this fashion also results from the fact that the film strips connected together to form a roll on the basis of known methods can bend. This is disadvantageous in view of the fact that in modern printers and other film processing equipment so-called "levelling loops" are often formed that serve to bridge the fluctuations in the speeds of the individual work stations. Should a bend in the roll appear during the formation of such levelling loops, then individual film strips could get caught on each other as a result of such bends and could make it necessary to interrupt printer operations.

SUMMARY OF INVENTION

A purpose of the present invention is to provide an uncomplicated and secure connection of film strips to form one long roll, in particular from short film strips such as those used for reorders. Individual short strips are cut along their ends, roughly perpendicular to their longitudinal edge so that the edges of the individual strips are roughly perpendicular to the longitudinal edge of the strip. In particular, there should be no problems in connecting those strips having only very narrow width on the film material surface between the last picture field and the back edge, or between the first picture field and the front edge of the strip. The film strips connected together to form a roll should be easy to handle and not take up space unnecessarily. Furthermore, the rolls should be able to be guided and directed along spools having small diameters without negatively affecting the secure transport of the roll. Furthermore, the connection should be easily detachable or removable following processing of the film. In addition, any bending of the film roll, such as can occur during the formation of levelling loops, is to be avoided.

In accordance with the invention, the foregoing problems are solved by inserting a double-T-joint, with two T-joints being connected back-to-back to form an I-joint, having essentially the same bending strength as the roll material to be connected as a connector between the ends of the strips to be connected. The two roughly parallel shanks of the double-T-joint are secured only in the longitudinal edge area of the roll material strips and roughly parallel to the edge. Further, the connecting bar that holds together the shanks of the double-T-joint are positioned flush against and parallel to the edges of the strips. As a result, on the one hand, a secure connection of the strips is achieved, and, on the other hand, the width of the roll produced in this way remains limited to the width of the film strips so that the roll can be easily handled and additional space is not unnecessarily required.

Because the double-T-joints are only secured along the longitudinal edge, one can easily fit together those strips that only have very little width on the film material surface between the last picture field and the back edge or between the first picture field and the front edge of the strip. Furthermore, the roll connected in this way remains very flexible and can, in particular, be guided and redirected across spools having a small diameter without negatively affecting the secure transport of the roll. This is also achieved by the fact that the bending strength of the connecting piece is about the same as the bending strength of the material of the individual short strips. A quasi-continuous roll is produced by the flush connection made by the connecting bar of the double-T-joint with the edges of the strips. As a result of this kind of connection of the individual strips, any bending of the roll, especially during the formation of levelling loops, is avoided. Because the double-T-joint is only secured along the edge areas and not across the entire width of the film strips, the connections can be separated again without great effort after the roll has been processed. Furthermore, it is easily possible to detect the connecting piece (e.g., optical detection), which is important in view of the separation of the connections after the roll has been processed.

In a particularly advantageous variation of the procedure, a double-T-joint has a connecting bar with a width of about 4 mm to about 6 mm. A length of each of the parallel shanks of the double-T-joint is about 15 mm to about 25 mm. A width of each of the shanks is about 3 mm to about 5 mm. In an exemplary embodiment, a width of the connecting bar is about 5 mm, a length of the shafts is about 20 mm and a width of the shanks is about 4 mm. Such double-T-joints have proven to be especially suitable, particularly in view of the redirection across spools having small diameters as are used in modern printers.

In an exemplary procedure of the invention, the shanks of the double-T-joint that run parallel to the edge of the strips are secured to the edge areas of the strips by means of taping. This is a simple procedure and allows for especially easy separation of the connections following processing so that the individual short strips can be reinserted in the envelopes belonging to the individual customers.

This for example, can be realized in such a way that the shanks of the double-T-joint are taped by means of uninterrupted adhesive tape rolls that run along the edge areas and then can be secured to the longitudinal edge areas, in a particularly uncomplicated and reliable manner.

A particularly secure connection of the shanks of the double-T-joint can be achieved by applying the adhesive tape along the edge areas after inserting a connecting piece to both sides of the roll levels defined by the strips.

In another exemplary variation of the procedure of the invention, the strips are connected only with light transparent connecting materials. In particular, a light-transparent double-T-joint is inserted and it is secured to the edge areas of the strips with light-transparent adhesive tapes. As a result, the DX code that is included on many films on the edge areas can be detected and automatically read.

Another variation of the procedure is characterized by the fact that the shanks of the double-T-joint that are parallel to the edge of the strips are secured to the strips by ultrasonic welding along the edge areas of the strips. This type of securing of the shanks of the double-T-joint to the edge areas of the film strips has also proven to be reliable.

BRIEF DESCRIPTION OF THE DRAWINGS

Other objects and advantages of the present invention will become apparent from the following description relative to the exemplary embodiments shown in the Figures, wherein:

FIG. 1 is an illustration of how, in accordance with an exemplary embodiment of the invention, the ends of two film strips can be connected with a double-T connecting joint inserted between the ends;

FIG. 2 shows another embodiment of how the double-T-joint can be prepared;

FIG. 3 shows another embodiment of how the double-T-joint can be inserted between ends of the film strips;

FIG. 4 shows another embodiment of how the double-T-joint can be secured to both sides of the film strips at the edge of the film strips with a continuous adhesive tape; and FIG. 5 shows the ends of two films strips that have been connected to each other.

DETAILED DESCRIPTION OF THE PREFERRED EMBODIMENTS

FIG. 1 illustrates the ends of two short film strips 1 and 2, that are supposed to be connected ("spliced") to each other. The film strips 1 and 2, have a cut at their front and back ends, so that the edges of the individual film strips, of which here the edges 11 and 21 are depicted, are virtually perpendicular to the longitudinal edge of the strips. It can be seen that only a very narrow portion 12 or 22, of film material is available between the last picture field 10, of the first film strip 1, and the edge 11 of this film strip 1, or between the first picture field 20 of the second film strip 2, and the edge 21 of this film strip 2, as is very often the case for film strips that arrive at the photo laboratory for reorders. Furthermore, a double-T connecting joint 3 can be seen in FIG. 1; it essentially has the same bending strength as the two film strips 1 and 2, to be connected. This double-T-joint 3 is inserted in a fashion yet to be explained between the ends of the film strips 1 and 2. In this way, the two parallel shanks 31 and 32 of the double-T-joint 3 extend only above the perforated edge area 13 and 14 or 23 and 24 where they are also secured. The connecting bar 33 of the double-T-joint 3, on the other hand, is located flush against the edges 11 or 21 of the two film strips 1 and 2.

FIG. 2 also depicts how the double-T-joint 3, can be prepared. There, a strip 30, for example a silicone paper strip is illustrated, on which many individual self-adhesive double-T-joints 3 are attached in series. This tape connection of double-T-joints to the silicone paper strip 30 is relatively easy to remove, as is the case with punch hole reenforcement rings, in particular by bending the silicon paper accordingly. One can notice from FIG. 2 that in this variation, the shanks 31 and 32 only have glue applied in the areas 310, 311, 320 and 321 in which they are supposed to be glued to the film strips 1 and 2, in the edge areas 13, 14, 23 and 24.

FIG. 3 shows one embodiment of how the individual double-T-joints 3 can be inserted between the film strips 1 and 2. The silicone paper strip 30 is guided across a guide shaft 4 in the direction of the arrow 34. One can see that the individual double-T-joints 3 are peeled off by the strips, in a manner similar to the peeling off of punch hole reenforcement rings, simply as a result of the redirection of the silicone paper strip 30. The double-T-joints are positioned on the edge areas 13, 14, 23 and 24, of the film strips 1 and 2, where they adhere easily, and/or can be pressed onto the edge areas by means of pressure rollers (designated in dashes) 50 and 60. These pressure rollers 50 and 60 can simultaneously be used for transporting the individual film strips that have been connected to form a roll. For this purpose, the pressure rollers can be driven in such a way that they, for example, turn in the direction of the arrows 501 or 601, and transport the film roll in the direction of the arrow T.

FIG. 4 shows another variation in which, after the double-T-joint 3 has been inserted, the double-T-joints 3 are glued to both sides of the film strips with continuous adhesive tapes 70 and 71 or 72 and 73, with the perforated edge areas 13, 14 or 23, 24, of the film strips 1 and 2. This can occur in the way indicated in FIG. 4: for example, with the aid of pressure rollers 80, 81, 82 and 83, the continuous adhesive tapes 70, 71, 72 and 73 are rolled off the rotating supply rolls 700, 710, 720 and 730. Glue is applied across the entire edge area of the film strip, in particular also across the shanks 31 and 32, of the previously inserted double-T-joints 3 so that they now reliably connect the individual film strips to form a roll made of individual film strips and connecting material. Simultaneously, these pressure rollers 80, 81, 82 and 83 can naturally also be used for transporting the roll in the direction of the arrow, T. The roll produced in this way is glued reliably and can be guided across directional spools having smaller diameters such as those used in modern printers. Furthermore, the connection of the individual films produced in this way to form a film strip can be separated with relative ease, namely by pulling off (e.g., automatically) the adhesive tapes and, if applicable, subsequently removing the double-T-joint, provided the double-T-joint 3 is not removed when the adhesive tape is removed. Naturally one could apply adhesive tape only to certain portions of the edge areas so that on one hand the double-T-joints 3 are attached and are secured to the film strips and, on the other hand, adhesive tape output can be simultaneously saved.

The ends of two film strips that have already been attached to each other are shown in FIG. 5. One can see the inserted double-T-joint 3 between the film strips 1 and 2, as well as the adhesive tapes 70 and 71 that are applied continuously. A material of about the same bending strength as that of the film strips has proven to be a suitable material for such connecting joints. In particular, a material that is similar to or the same as the film material, for example a cellulose ester, is suitable. Particularly suitable dimensions for such double-T-joints include, for example, along the lengths 312 or 322 of the parallel shanks 31 or 32, about 15 mm to about 25 mm, and in particular about 20 mm. Suitable dimensions for the width 330 of the connecting bar 33 are about 4 mm to about 6 mm, in particular about 5 mm. The width 313 or 323 of the shanks 31 or 32, is preferably about 3 mm to about 5 mm, in particular about 4 mm. Furthermore, another advantageous feature of the connecting materials can be seen in FIG. 5: the materials are light-transparent, which is very advantageous in view of the fact that then the DX code, which is inserted in the edge area of the films, can still be read automatically.

At this point it should be noted that the way in which the double-T-joints 3 are attached to the edge areas of the film strips certainly is not limited to the adhesive procedure. Other suitable connecting techniques, such as ultrasonic welding, can be used to provide equally good results rendering the adhesive tape completely superfluous, with the double-T-joint 3 being welded directly to the film strips in their edge area. It is also conceivable that the double-T-joint and the film strip are connected to each other by using the so-called "hot sealing" method. For this, it is necessary that both the film strips as well as the double-T-joint have a coating that melts at a lower temperature than that of the film material so that the strips and the double-T-joint can be connected to each other without damaging the film material.

Advantages of the exemplary variations of the procedures of the invention described herein with the aid of the Figures are recognizable: on one hand, a secure connection of the strips is achieved and, on another hand, the width of the roll produced in this way is limited to the width of the film strips so that the roll can be easily handled and does not require additional space unnecessarily. Because the double-T-joints are secured only in the edge area, there is no problem in splicing strips that only have a film material surface of very small width between the last picture field and the back edge or between the first picture field and the front edge of the strip. Furthermore, the spliced roll has a uniform bending strength throughout, even across the splice, and, in particular, can also be guided across spools having very small diameters without negatively affecting the uninterrupted transport of the roll. This is achieved by the fact that the bending strength of the connecting piece is about the same as the bending strength of the material of the individual short strips. In addition, this type of connection of the individual strips avoids any bending of the spliced roll; in particular, such bends can also be avoided near levelling loops. As a result of the flush attachment of the connecting bar of the double-T-joint to the given edges of the strip, a quasi-continuous, bend-free and uniformly flexible roll is produced. Because the double-T-joint is secured only in the edge areas and not across the entire width of the film strips, the connections can also be separated again without great effort once the roll has been processed. Furthermore, the connecting sections ("splice") can be easily detected (e.g., optical detection), which is important when separation of the connections is desired or when placement of the film strips with respect to the concomitant customer order following processing of the roll is monitored. With the aid of the light-transparent connecting materials, it is also possible to continue to read the DX code automatically.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Process for connecting a number of short strips of photographic material to a long roll, each of said short strips having first and second ends which are cut approximately perpendicular to a longitudinal edge, said process of connecting at least two of said short strips comprising the steps of:
   securing ends of the short strips to be connected with a double-T-joint having essentially the same bending strength as a material of the short strips to be connected, said double-T-joint being placed as a connecting piece between ends of the short strips to be connected; and
   securing two parallel shanks of the double-T-joint only in areas of a longitudinal edge of the short strips, roughly parallel to the longitudinal edge, such that a connecting bar of the double-T-joint connecting the two shanks of the double-T-joint is placed against and parallel to the ends of the short strips being connected.

2. Process according to claim 1, wherein the double-T-joint has a connecting bar with a width of about 4 mm to about 6 mm and parallel shanks with a length of about 15 mm to about 25 mm and a width of about 3 mm to about 5 mm.

3. Process according to claim 1, wherein the double-T-joint has a connecting bar with a width of about 5 mm and shanks with a length of about 20 mm and a width of about 4 mm.

4. Process according to claim 1, further comprising the step of securing the shanks of the double-T-joint that are parallel to the longitudinal edge of the short strips to the short strips by taping them to the areas of the longitudinal edges of the short strips.

5. Process according to claim 4, further comprising the step of taping the shanks of the double-T-joint with adhesive tape guided across and secured to the edge areas.

6. Process according to claim 5, further comprising the step of taping the edge areas with adhesive tape on both sides of a plane defined by the strips after the double-T-joint has been inserted.

7. Process according to claim 1, wherein said steps of securing include the step of connecting the short strips with light-transparent connecting materials.

8. Process according to claim 1, wherein said steps of securing include the step of connecting the short strips with a light-transparent double-T-joint secured to the edge areas of the short strips with light transparent adhesive tape.

9. Process according to claim 1, wherein said steps of securing include the step of securing the shanks of the double-T-joint that are parallel to the longitudinal edge of the short strips to the short strips by ultrasonic welding.

10. Process for connecting strips of photographic material, each of said strips having a longitudinal edge with first and second ends located at opposite sides of the longitudinal edge, said process of connecting at least two of said strips comprising the steps of:
    securing a first end of one of said strips to a second end of a second of said strips using a least one double-T-joint having two parallel shanks interconnected by a connecting bar, said double-T-joint being placed between said first end of said one strip and said second end of the second strip to be connected; and
    securing said shank of said at least one double-T-joint along said longitudinal edge of said one strip and said second strip such that said connecting bar of the at least one double-T-joint is placed against and parallel to a longitudinal edge of said one and said second strips being connected.

* * * * *